March 1, 1966     C. A. VOGENTHALER     3,238,103
THERAPEUTIC COMPOSITION AND METHOD OF MAKING IT
Filed April 26, 1961
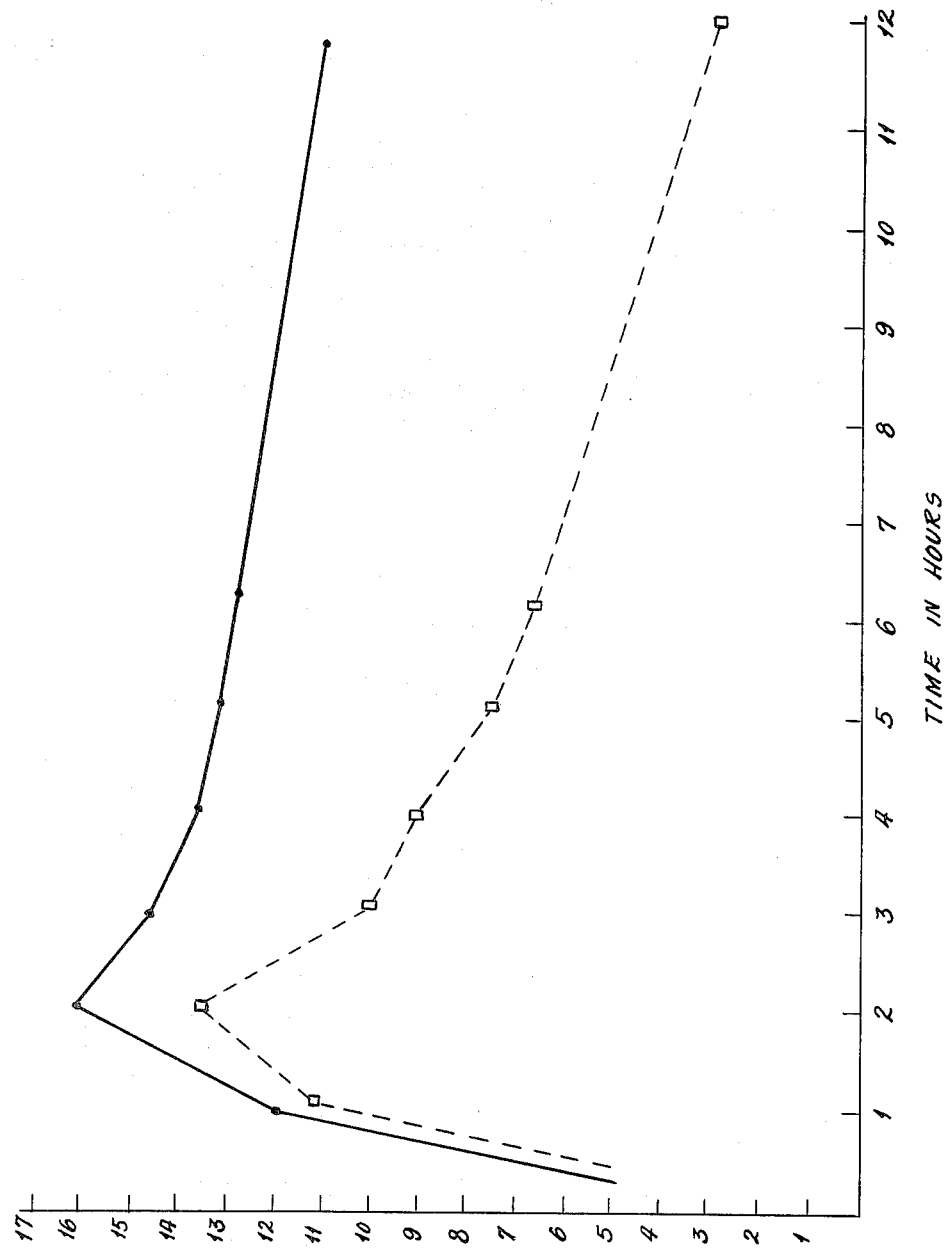
INVENTOR:
CLARENCE A. VOGENTHALER
BY
ATTORNEYS.

3,238,103
THERAPEUTIC COMPOSITION AND METHOD
OF MAKING IT
Clarence A. Vogenthaler, 29 N. Clay, Ferguson, Mo.
Filed Apr. 26, 1961, Ser. No. 105,696
2 Claims. (Cl. 167—82)

This invention relates to the enhancement of the effectiveness of orally administered water soluble drugs.

It has been observed heretofore that the efficacy of certain drugs can be enhanced by their administration in an edible fat or oil (see, for example, Climenko, U.S. Patent No. 2,238,897). It has further been found that greater enhancement of the adsorbable sulfonamides can be obtained by their incorporation into a lipid aqueous emulsion (see Feinstone, U.S. Patent No. 2,867,565). Based upon the teachings of the latter patent, it might have been thought that the enhancement of the effectiveness of most, and perhaps all, orally administrable drugs could be accomplished by incorporating them into an emulsion form. It has been established that the efficacy of a great many drugs is actually so enhanced. However, in clinical testing of various orally administered drugs in lipid-aqueous emulsions, an apparent anomaly was observed. Some drugs showed occasionally increased effectiveness when they were administered in emulsion form, but the same drug, in the same emulsion for the most part would show no improvement in effectiveness over its administration in water alone, or would even show a decrease in effectiveness.

It has been discovered that the method of compounding the lipid-aqueous emulsion-drug composition, particularly in the case of water soluble drugs, is of critical importance.

One of the objects of this invention is to provide a method of compounding lipid-aqueous emulsion-drug compositions by which the efficacy of the drug is enhanced beyond that of the drug in either aqueous or lipid vehicles alone, and beyond that of the drug in a lipid-aqueous emulsion compounded in the conventional manner.

Another object is to provide a composition containing one or more water soluble drugs, in which the efficacy of the drug or drugs upon oral administration is greater than that of the drugs in either aqueous or lipid vehicles alone, and greater than that of water soluble drugs in lipid-aqueous emulsions compounded in the conventional manner.

Other objects will become apparent to those skilled in the art in the light of the following disclosure.

In the drawing, the graph portrays the blood levels of salicylate in rats after oral ingestion of equal amounts of sodium salicylate in the form of an aqueous solution (dotted line) and in the form of the composition of Example 2, infra (solid line).

In accordance with this invention, generally stated, a therapeutic composition for oral administration is provided by mixing an orally administrable water soluble particulate drug with an edible fat or oil (lipid) in such a way that the particles of the drug are thoroughly dispersed through and encapsulated within the lipid. The drug-in-lipid dispersion is now emulsified with water or an aqueous solution of the same or a different drug, in such a way that a predetermined amount, which may be all of the water soluble drug dispersed in the lipid, remains in the discontinuous lipid phase of the emulsion.

The resulting composition possesses the desirable features of both the water solution of drug and of an oil suspension, and certain additional advantages as well.

The term "lipid" is used herein to mean all suitable edible fats and oils, including, by way of illustration, corn oil, coconut oil, cottonseed oil, peanut oil, butterfat, pecan oil, beef fat, lard and mutton fat.

Drugs, the effectiveness of which is enhanced by their incorporation into an emulsion in accordance with this invention, include, by way of example, aminophylline, morphine sulfate, codeine phosphate, merperidine hydrochloride, methadon hydrochloride, water soluble salicylates, antipyrine, aminopyrine, homatropine methylbromide, methantheline bromide, hydrolazine hydrochloride, methacholine chloride, bethanechol chloride, neostigmine bromide, amphetamine sulfate, methamphetamine hydrochloride, methoxyphenamine hydrochloride, phenylephrine hydrochloride, racephedrine hydrochloride, phenobarbital sodium, methabarbital sodium, butabarbital sodium, mephobarbital sodium, aprobarbital sodium, barbital sodium, diphenyl hydrochloride, sodium trimethadione, caffeine, diphenylhydantoin sodium, and any of the other therapeutically useful water soluble salts of these various drugs and other orally administrable water soluble drugs.

The following examples are merely illustrative.

EXAMPLE 1

Lipid phase: Parts by weight
  Corn oil _____ 36.000
  Butylated hydroxyanisole (anti-oxidant) ___ .004
  Sodium salicylate (water soluble drug) ____ 6.54
Water phase:
  Glyceryl monostearate (emulsifier-stabilizer) 6.5
  Sucrose _____ 10.0
  Saccharin _____ .232
  Sodium benzoate (preservative) _____ .38
  Ethylene diamine tetraacetic acid tetra sodium (sequestering agent) _____ .044
  Flavoring material _____ .275
Water, q.s. ad. 100 parts.

The product is compounded as follows. The ingredients of the lipid phase are mixed thoroughly to give a uniform suspension, and are heated to approximately 50° C. The various ingredients of the water phase are mixed together in the water, and heated, to dissolve the soluble materials, to about 70° C. When the dissolution has been accomplished, the temperature of the solution is reduced to the same temperature as that of the lipid phase, preferably about 50° C. The water phase is then agitated in a blade mixer or the like, and the lipid phase, which has been agitated to maintain a uniform suspension of the drug in the lipid, is added, slowly, to the water phase, until an emulsion forms. The emulsion, still agitated, is then preferably run through a colloid mill until a fine, stable dispersion of the lipid phase in the (continuous) aqueous phase is obtained.

In this example, it is to be noted that the water soluble drug is confined to the lipid phase of the emulsion, except for a small amount which may, in effect, be mechanically dislodged from the lipid phase, but this loss from the lipid phase is negligible.

EXAMPLE 2

Percent
Cottonseed oil _____ 36.000
Butylated hydroxyanisole (anti-oxidant) ___ .004
Sodium salicylate _____ 4.087

Water phase:                                              Percent
   Sodium benzoate (preservative) ............... .38
   Sucrose ....................................... 10.000
   Saccharin ..................................... .05
   Sodium cyclamate (sweetener) .................. .40
   Sodium salt of alginic acid ................... .50
   Polyoxyethylene sorbitan monostearate
     (non-ionic emulsifier) ..................... 3.00
   Mono and diglycerides of higher fatty acids
     and soap (stabilizer) ...................... 3.00
   Sodium ethylene diamine tetraacetate .......... .044
   Sodium salicylate ............................. 2.453
   Flavor ........................................ .29
Water, q.s. ad. 100%.

The product of Example 2 is compounded in the same way as the product of Example 1.

It will be noted, that, in this example, which constitutes the preferred embodiment, the water soluble drug is contained in both the lipid phase and the aqueous phase, in the proportion of approximately 62½% in the lipid phase and 37½% in the water phaase. It might have been expected that the results, in blood levels, of the administration of the product of this example would lie somewhere intermediate the results to be obtained from the administration of the drum in aqueous solution and in oil. However, it has been found that the administration of this composition produces a higher initial blood level concentration than either the lipid or the aqueous dosage forms, as well as a higher prolonged level than either of the other forms, as indicated in the drawing.

Among the ingredients of the water phase of Example 2, the sodium salt of alginic acid is available commercially, under the trademark "Kelgin" from the Kelgo Company. The polyoxyethylene sorbitan monostearate is available commercially as "Tween 60" from Atlas Powder Company in whose booklet, copyright 1950, entitled "Surface Active Agents," the physical and chemical characteristics are set out.

EXAMPLE 3

Lipid phase:                                              Percent
   Peanut oil .................................... 38.600
   Butylated hydroxytoluene ...................... 0.004
   Phenobarbital sodium .......................... 0.980
Water phase:
   Polyoxyethylene sorbital monostearate ......... 3.000
   Glycerol monostearate ......................... 3.000
   Sucrose ....................................... 10.000
   Calcium cyclamate (sweetener) ................. 0.200
   Benzoic acid .................................. 0.380
   Saccharin ..................................... 0.032
   Flavor ........................................ 0.200
Water, q.s. ad. 100%.

The product of this example is compounded in the same way as that of Example 1.

EXAMPLE 4

Lipid phase:                                              Percent
   Corn oil ...................................... 38.500
   Propylgallate ................................. 0.004
   Aminophylline ................................. 1.280
Water phase:
   Phospholipids (e.g. lecithin) ................. 3.000
   Polyoxyethylene sorbitan monostearate ......... 3.000
   Sucrose ....................................... 10.000
   Calcium cyclamate ............................. 0.200
   Alkyl hydroxybenzoate ......................... 0.380
   Saccharin ..................................... 0.032
   Flavor ........................................ 0.200
Water, q.s. ad. 100%.

The product of this example is compounded in the same way as that of Example 1.

In the case of the compositions in which the water soluble drug is maintained solely in the lipid phase, the initial blood level is somewhat lower than it is from the drug administered in aqueous solution. However, the blood levels quickly meet, and, after three or four hours, the aqueous solution blood level drops sharply, while the blood levels produced by the compositions of this invention in which all of the drug is in the lipid phase continue to be high, and, contrary to what would logically be expected, they remain higher even longer than those produced by the drug in an unemulsified lipid base.

It can be appreciated that the gist of this invention lies in the encapsulation of a water soluble drug in the lipid phase of the lipid-aqueous emulsion, and, in the preferred embodiment, in incorporating a predetermined amount of the drug in the aqueous phase as well. Accordingly, the particular fats, anti-oxidants, emulsifiers, stabilizers, sweeteners, preservatives, sequestering agents, flavoring materials, and the like, while they must be suitable, can be taken from the large number of such ingredients known to the art.

The proportions of the drug in the lipid phase and in the water phase, in the compositions in which the drug is placed in both, will vary according to the type of drug, and the condition which is desired. Thus, the 62½%–37½% distribution of sodium salicylate in Example 2 gives a nearly uniform blood level for at least twelve hours. In the case of aminophylline, the distribution should be closer to 75% in the lipid phase and 25% in the aqueous phase. With phenobarbital sodium, the distribution should be around 50–50 to give the most nearly uniform blood level over an extended period of time. In the case of all of these water soluble drugs, the result of the distribution of a portion of the drug in the lipid phase and another portion of the aqueous phase, with a major portion being in the lipid phase, produces the unexpectedly superior results over that obtained by the administration of the drug in the aqueous solution, lipid vehicle, or even the lipid aqueous emulsion in which the drug is confined to one phase. It should be noted that in the usual compounding of water soluble drugs into emulsion form, the drug is dissolved in the water phase, since this is a much simpler way to make an emulsion.

It can also be seen that two or more drugs can be incorporated into the lipid phase and two or more into the aqueous phase, either in the same product or different products. The drug in the lipid phase can be different from the drug in the aqueous phase. Numerous other variations in the product and method of the invention, within the scope of the appended claims will occur to those skilled in the art in the light of the foregoing disclosure.

Having thus described the invention, what is claimed and desired to be secured by Letters Patent is:

1. The process of making a therapeutic composition for oral administration comprising dispersing a particulate water soluble drug in a lipid, whereby the particles of said drug are encapsulated by the said lipid, dissolving a substantial amount of a water soluble drug in an aqueous medium, and emulsifying the said lipid and aqueous medium to form a lipid-aqueous emulsion in which the lipid phase is discontinuous.

2. An orally administered therapeutic composition comprising particulate sodium salicylate dispersed in and confined to the discontinuous lipid phase of a lipid-aqueous emulsion, and a lesser but therapeutically significant portion of said sodium salicylate dissolved in a continuous, aqueous phase of said emulsion, the sodium salicylate in the lipid phase being on the order of 62½% and the sodium salicylate in the aqueous phase being on the order of 37½% by weight of the total salicylate.

(References on following page)

References Cited by the Examiner

UNITED STATES PATENTS

| | | | |
|---|---|---|---|
| Re. 24,899 | 11/1960 | Green | 252—316 |
| 2,183,053 | 12/1939 | Taylor | 99—11 |
| 2,238,973 | 4/1941 | Climenko | 167—65 |
| 2,311,923 | 2/1943 | Lautmann | 167—82 |
| 2,805,977 | 9/1957 | Robinson et al. | 167—82 |
| 2,867,565 | 1/1959 | Feinstone | 167—51.5 |
| 2,875,130 | 2/1959 | Grass et al. | 167—82 |
| 2,903,395 | 9/1959 | Salivar | 167—65 |
| 2,916,416 | 12/1959 | Buckwalter | 167—55 |
| 2,951,014 | 8/1960 | Garman | 167—82 |
| 2,969,330 | 1/1961 | Brynko | 252—316 |
| 2,969,331 | 1/1961 | Brynko | 252—316 |
| 2,988,484 | 6/1961 | Barsky et al. | 167—82 |

FOREIGN PATENTS 759,577  10/1956  Great Britain.

OTHER REFERENCES

Eastland: "Aspects of Modern Formulation," Manufacturing Chemist, vol. 22, No. 10, pp. 398–402, October 1951.

Stephens et al.: "New Oral Sulfonamide Dosage Form With Prolonged Action," The Journal-Lancet 75 (10), 437–440, October 1955.

LEWIS GOTTS, *Primary Examiner.*

MORRIS O. WOLK, *Examiner.*